INVENTORS
JOHN L. ROGERS
HORACE T. MANN
BY
Jerry A. Dinardo
AGENT

ASSOCIATIVE MEMORY SYSTEM

Filed April 11, 1963 4 Sheets-Sheet 2

INVENTORS
JOHN L. ROGERS
HORACE T. MANN
BY
Jerry A. Dinardo
AGENT

INVENTORS
JOHN L. ROGERS
HORACE T. MANN
BY Jerry A. Dinardo
AGENT

ASSOCIATIVE MEMORY SYSTEM

Filed April 11, 1963 4 Sheets-Sheet 4

JOHN L. ROGERS
HORACE T. MANN
INVENTORS

BY Jerry G. Dinardo
AGENT

#United States Patent Office 3,320,592

Patented May 16, 1967

3,320,592

ASSOCIATIVE MEMORY SYSTEM

John L. Rogers, Hermosa Beach, and Horace T. Mann, Palos Verdes Estates, Calif., assignors, by mesne assignments, to TRW Inc., a corporation of Ohio Filed Apr. 11, 1963, Ser. No. 272,404

17 Claims. (Cl. 340—172.5)

This invention relates to associative memory systems and particularly to an improved memory system capable of storing digital information in binary form, and of reading out those words for which a portion of their information content lies between two selected numerical limits.

There exist problems where is it required to select, from a set of records, all those that lie within a specified range. Usually, the identification is determined by a key portion of each record, the remaining portion being the desired output data. The selection may be made by a sequential search and comparison of each record.

According to this invention, a system is provided which eliminates the necessity of a sequential search. The records are stored in a specially designed associative memory which allows any specified portion of each record to be compared simultaneously with the contents of an external register. The two limits of the range are inserted in turn as keys into the external register, and logic circuitry in the memory then permits all records, whose key portions lie within the range, to be read out in sequence. The memory is designed using cryogenic logic circuitry.

Figure 5:
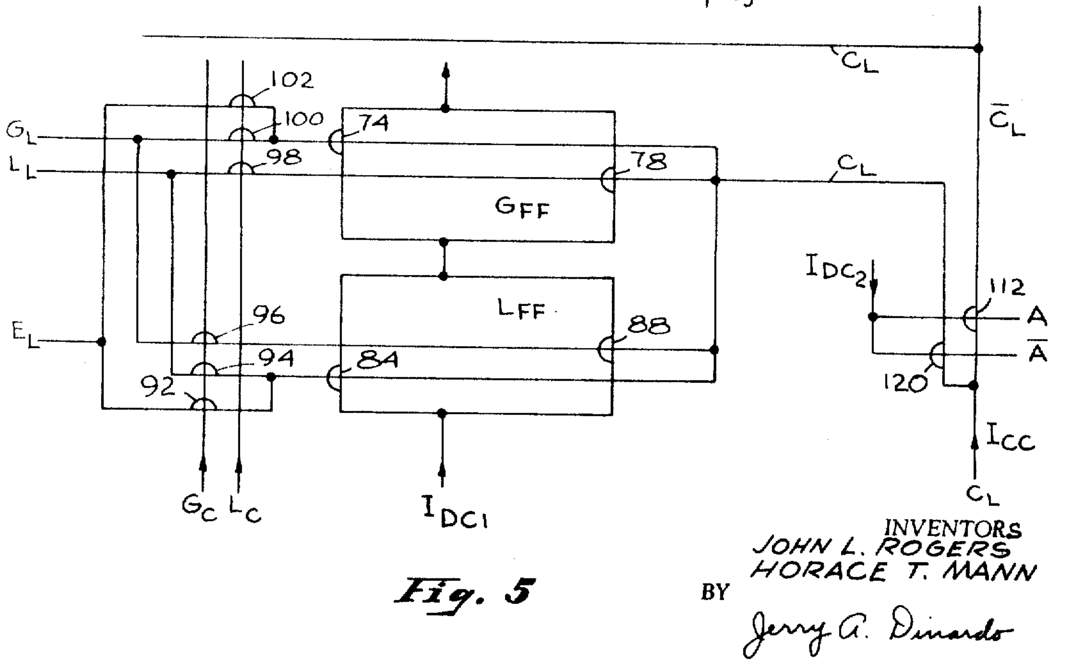
Figure 6:
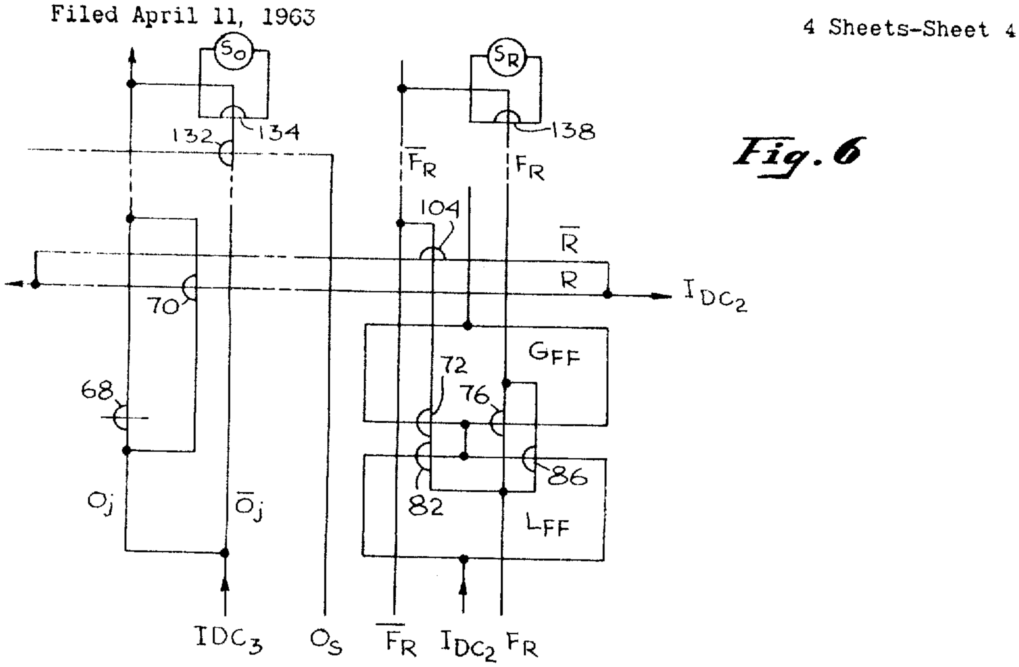
Figure 7:
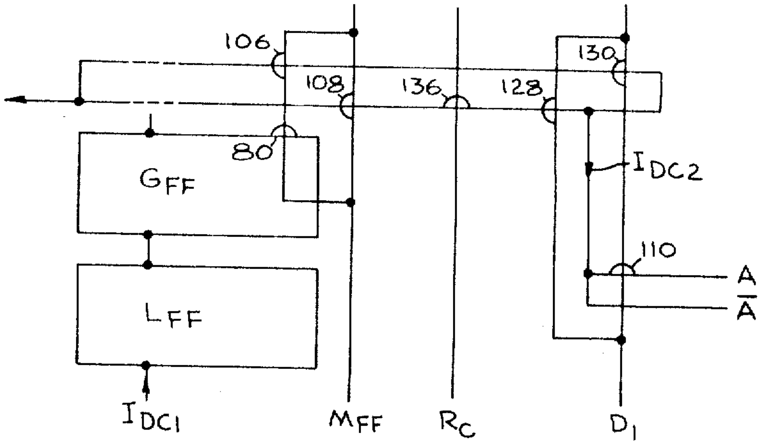
Figure 8:
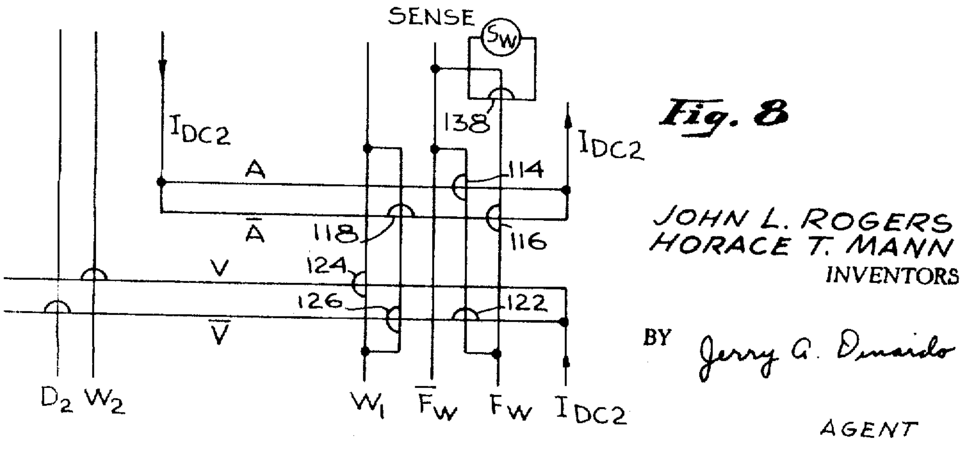

FIGS. 5, 6, and 7 are simplified schematics of portions of the result store used in the control module of the associative memory system; and FIG. 8 is a simplified schematic of other portions of the control module.

Figure 1A:
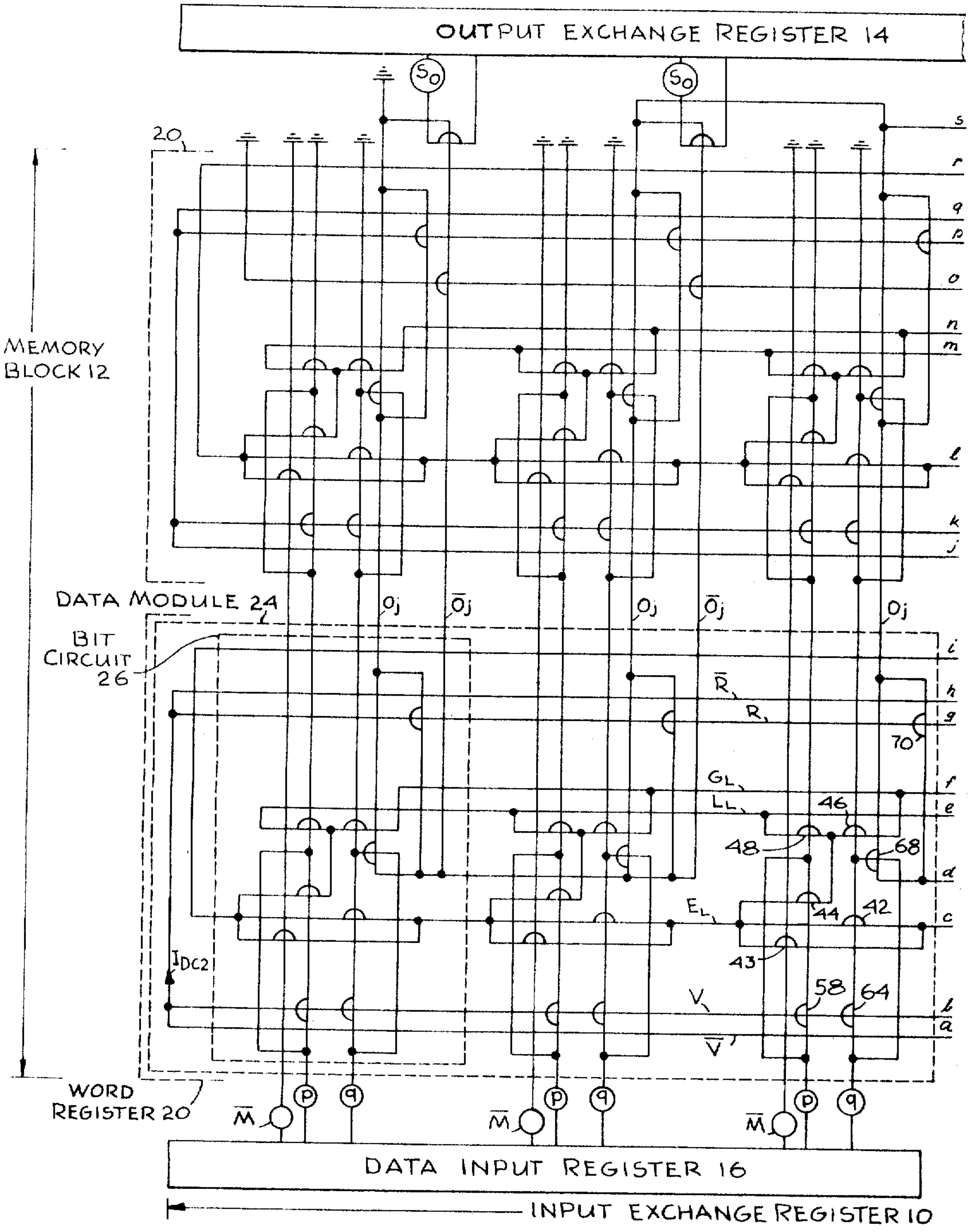
FIGS. 1A and 1B are portions of a schematic circuit of the associative memory system according to the invention.
Figure 1B:
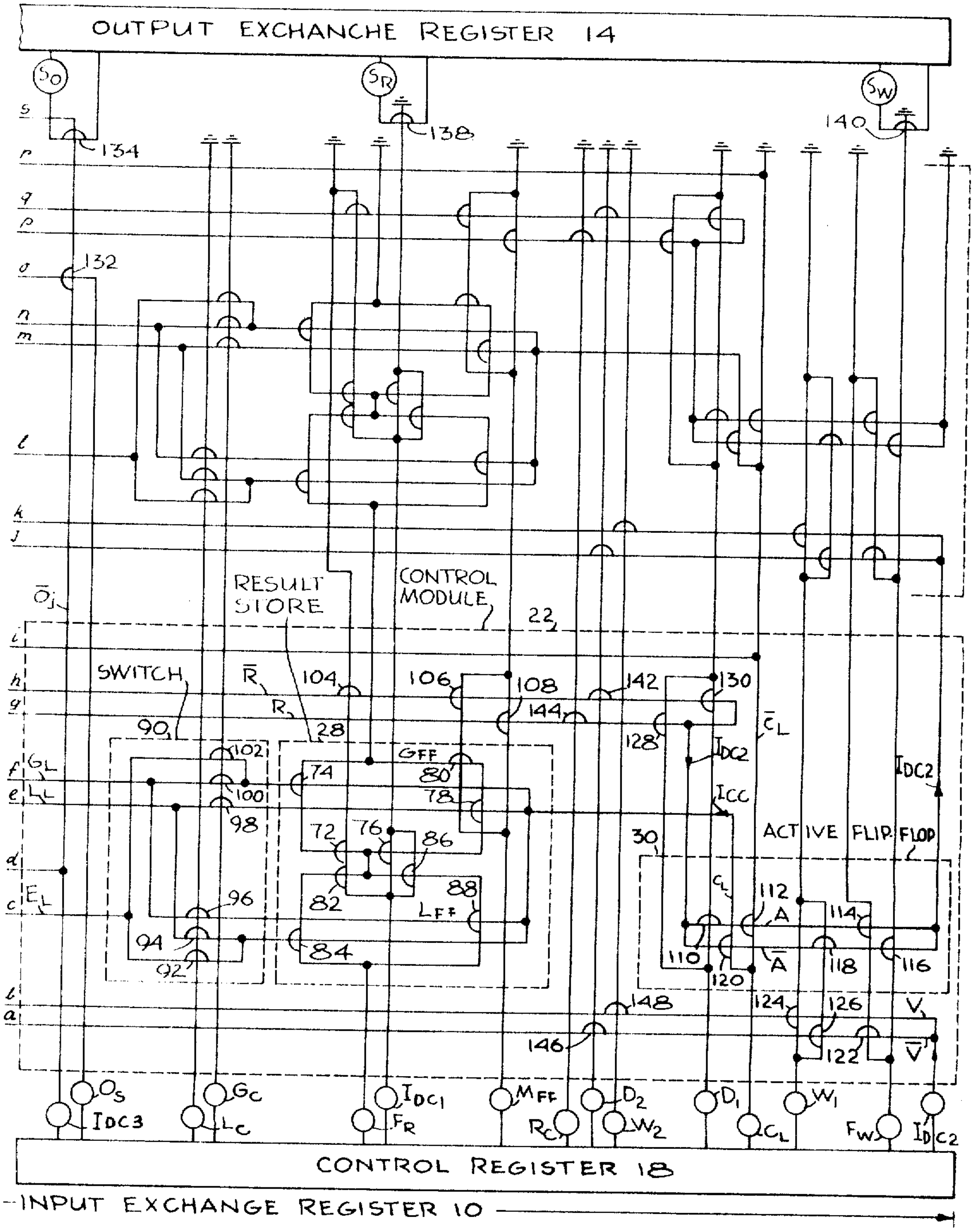

The associative memory system according to the invention is illustrated in the schematic circuit, of which FIG. 1A is one half portion and FIG. 1B is the other half portion. The memory system comprises an input exchange register 10, a memory block 12, and an output exchange register 14. The input exchange register 10 includes a data portion or data input register 16, and a control portion or control register 18. Similarly the memory block 12 includes a number of word registers 20. Each word register 20 in the memory block 12 has a control module 22 and a data module 24 made up of a plurality of bit circuits 26. There is one bit circuit 26 for each information bit. Each control module 22 contains a result store 28 and certain other control logic circuits.

Data modules in the data input register 16 are connected with corresponding bit circuits 26 in the memory block 12. Information to be written into the data module 24 of the block 12 and key information for comparison purposes are transmitted from the data input register 16 along vertical conductors to all bit circuits 26. Similarly, in reading, information is transferred from the bit circuits 26 of a selected word register to the output exchange register 14. Vertical conductors also connect the control register 18 with the control modules 22 of the memory block 12. Signals along these conductors determine which of the operations of writing, comparison, reading, or deletion is to be performed, and also serve to identify or modify the information contained in the control module 22.

The bit circuits 26 of each word register 20 as a group may receive signals along horizontal lines from the control logic circuits in their corresponding control module 22. The same bit circuits 26 as a group may transmit information along horizontal lines to the result store 28 in their corresponding control module 22.

The memory system functions by comparing an external key with all of the stored words simultaneously and recording the outcome of the comparison for each word in the corresponding result store 28. The key which is inserted into the data input register 16 may be any arbitrary field of digits. A bit position which is not included as a portion of the key receives a "mask" command and does not contribute to the results of the comparison. Thus, a search may be made on any part of the information stored in the word registers 20.

To perform a between limits comparison, the lower of two limits is inserted as a key in the data input register 16. This key is then transmitted to all bit circuits 26 not receiving a mask command. As a result of the comparison between stored data and input data, the logic associated with each bit circuit 26 assumes one of three states, (1) "greater than," (2) "less than," (3) "no decision," with respect to the applied key. The no decision state results if the stored bit is either masked or equal to the applied key. In each word register 20, a comparison current enters the word register 20 at the bit circuit 26 representing the most significant bit and links all less significant bit circuits 26 to their result store 28. The path chosen by the comparison current is determined by the state of the most significant bit in which an inequality occurs regardless of the logical states of the bit circuits of the less significant bits. The comparison current sets a flip flop $G_{FF}$ in the result store 28 of each word register 20 whose information content is "greater than" or "equal to" the applied key. After the results are stored a second key representing the upper of the two limits may be applied. The comparison between key and applied data proceeds as before except that another flip flop $L_{FF}$ is set in the result store 28 of each word register 20 in which an equality or "less than" comparison occurs.

By examining the state of the pair of flip flops $G_{FF}$ and $L_{FF}$ in any result store 28, it is possible to determine whether the stored word falls within limits set by the two applied keys. It will be assumed that a large number of stored words have been so identified. It is now the function of a read select circuit to simultaneously examine all result stores 28 to locate the first of this set of identified stored words and to establish a read current for that word only. As soon as the first word is read nondestructively into the output exchange register 14, its result store 28 must be modified by a delete circuit to remove it from the set of words waiting to be read. This is accomplished by changing the state of either one of the pair of result store flip flops $G_{FF}$ and $L_{FF}$. The read select circuit may then be used to find the first of the remaining words of the set, and the read operation may be repeated. When all words between the specified limits have been read, the read select circuit indicates the end of the sequence.

Since the range specified by a pair of keys may be specified arbitrarily, the choice of two identical keys allows the memory to search for words equal to the given key.

An "active" flip flop 30 is included in each control module 22. Its purpose is to mark those words which have been eliminated from the memory. Any word which has been selected for reading may be eliminated from the memory after it has been read, if desired, by changing its "active" flip flop 30 to the inactive state. Words which are inactive block the comparison current and thus are kept from contributing to the "greater than," "less than" comparisons.

A write select circuit linking the "active" flip flops 30 of all word registers 20 is used to locate inactive words when a new word is to be written into the memory. The new word is inserted in the data input register 16 and written over the first inactive word located by the write select circuit. As soon as the new word is written, its "active" flip flop 30 is changed to the active state.

A more detailed desciption will now be given of the circuitry used in the memory system.

THE CRYOTRON

Figure 2:
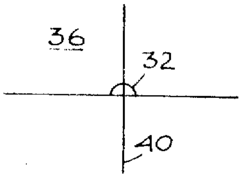
FIG. 2 is a diagrammatic view of a thin film cryotron.

All of the circuits utilize thin film cryotrons and superconducting interconnecting leads as the only circuit elements. Referring to FIG. 2, one example of a thin film cryotron 36 may comprise a relatively wide thin film gate element 38, shown symbolically as a semi-circular segment, insulated from and magnetically coupled to a relatively narrow thin film control element 40, shown symbolically as a line crossing the semi-circular segment. In this, form, the elements 38 and 40 are arranged at right angles to each other. In the so-called in-line cryotron the gate and control elements are arranged in parallel registry and may have substantially the same widths. The gate element 38 is preferably formed of a low critical current superconductor and the control element 40 is formed of a high critical current superconductor. When no current or when current below a certain critical valve flows through the control element 40, the gate element 38 is in the superconducting state and will pass current. When current in excess of a certain critical value flows through the control element 40, the magnetic field caused by this current flow switches the gate element 38 resistive so as to prevent current flow therethrough. Thus, the cryotron 36 is a switch that can open or close a current path through the gate element 38 in response to the current through the control element 40.

Some of the circuits in the data module 24 of the memory block 12 will now be described.

THE COMPARISON CIRCUIT

Figure 3:
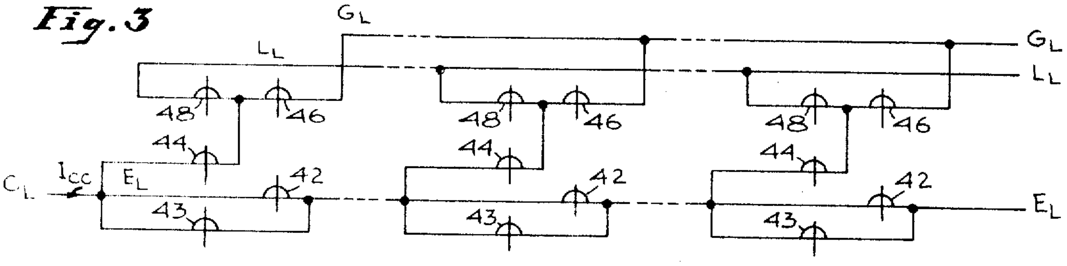
FIG. 3 is a schematic of a comparison circuit used in the control module of the associate memory system.

In order to perform a simultaneous comparison for equality or for the sign of the inequality of an applied key and a stored record, a comparison circuit must link each bit circuit of the memory block 12. A key bit may be a mask command or a binary 1 or binary 0 command. FIG. 3 shows a comparison circuit for 3 bits of a word register 20. A comparison current $I_{cc}$ is caused to flow in a line $C_L$ and enter the most significant bit in this line $C_L$. The direction of the comparison current $I_{cc}$ is immaterial. At the bit circuit of the most significant bit, the comparison current $I_{cc}$ will be forced to flow in one of three lines $E_L$, $G_L$, or $L_L$. The path of current flow is determined by the states of five cyrotrons 42, 43, 44, 46, and 48. Cryotrons 42 and 43 are in parallel in the $E_L$ line. For current to be diverted into the $G_L$ line, it must pass through the gates of cryotrons 44 and 46. For current to be diverted into the $L_L$ line it must pass through the gates of cryotrons 44 and 48. By means of logic in the bit circuit, signals are applied to the control elements of the selected ones of the cryotrons 42–48 so that only one of the three paths, namely the line $E_L$, the diversion brance into line, $G_L$, or the diversion branch into line $L_L$ is superconducting. If the stored bit is equal to the key bit, cryotron 44 will be resistive, cryotron 42 will be superconducting, and the comparison current $I_{cc}$ will flow in the $E_L$ line If the stored bit receives a mask command, cryotrons 46 and 48 will be resistive and cryotron 43 will be superconducting, and the comparison current $I_{cc}$ will likewise flow in the $E_L$ line. If the stored bit is greater than the key bit, cryotrons 42 and 43 will be resistive, cryotron 44 will be superconducting, cryotron 48 will be resistive, cryotron 46 will be superconducting, and the comparison current $I_{cc}$ will be diverted into the $G_L$ line. If the stored bit is less than the key bit, cryotrons 42 and 43 will be resistive, cryotron 44 will be superconducting, cryotron 46 will be resistive, cryotron 48 will be superconducting, and the comparison current $I_{cc}$ will be diverted into the $L_L$ line.

If the comparison current $I_{cc}$ is diverted to either the $G_L$ or $L_L$ line, it will remain in that line through all the following bit circuits irrespective of the states of the cryotrons in the bit circuits. If the comparison current enters the $E_L$ line, it will pass along that line into the second bit circuit where the state of the cryotrons in that bit circuit will determine the current path. Thus the line on which the current leaves the least significant bit of the word register is determined by the most significant bit at which an inequality occurs.

THE BIT CIRCUIT

Figure 4:
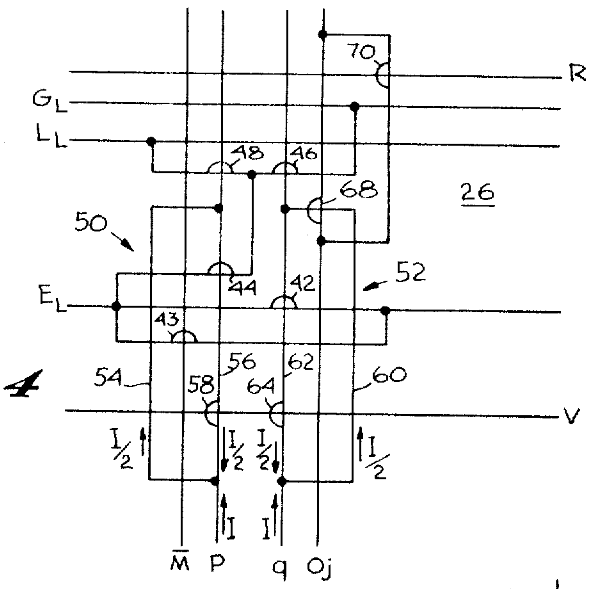
FIG. 4 is a schematic of a bit circuit used in the data module of the associative memory system.

A preferred form of bit circuit 26 is shown in FIG. 4. The bit circuits of the more significant bits would appear on the left, while those of the less significant bits would appear on the right. Floor vertical lines $\overline{M}$, $p$, $q$, and $0_j$ link all the bit circuits associated with a given digit. Five horizontal lines V, $E_L$, $L_L$, $G_L$, and R link all the bit circuits of a given word register. The $E_L$, $L_L$, and $G_L$ lines and cryotrons 42, 43, 44, 46, and 48 are those of the comparison circuit of FIG. 3 already described.

The bit circuit 26 includes two persistent current storage loops 50 and 52, shown in heavy lines. One storage loop 50 comprises two electrically parallel branches 54 and 56 of the line $p$. The branch 56 includes the gate element of a cryotron 58 that is controlled by a signal applied to a horizontal line V. The branch 56 also serves as the control of cryotron 44. Similarly, the other storage loop 52 comprises two electrically parallel branches 60 and 62 of the line $q$. The branch 62 includes the gate element of a cryotron 64 that is controlled by a signal applied to the horizontal line V. The branch 62 also serves as the control of cryotron 42. The line $p$ serves as the control of croyotron 48, and the line $q$ serves as the control of cryotron 46.

The cryotron 43 is controlled by a signal applied to the vertical line $\overline{M}$. On a mask command, no signal is applied to the line $\overline{M}$; when the command is to unmask the signal will be applied. The vertical line $0_j$ is in series with two parallel connected cryotrons 68 and 70. The branch 60 of storage loop 52 serves as the control of cryotron 68. The cryotron 70 is controlled by a signal applied to a horizontal line R.

In order to write a record into a word register, current is applied to the horizontal line V which links all bit circuits 26 in that word register. The current in the line V switches all of the cryotrons 58 and 64 in the word register resistive, thereby destroying any persistent currents flowing in the storage loops 50 and 52. If it is desired to write a binary one into a bit circuit, currents I are applied to the lines $p$ and $q$. Because cryotrons 58 and 64 are resistive, these currents flow through the branches 54 and 60 of the storage loops 50 and 52. The current in line V is then removed so that cryotrons 58 and 64 become superconducting but the current distribution in the storage loops 50 and 52 remains unchanged. When the currents in the lines $p$ and $q$ are turned off, a persistent current is etablished in each of the storage loops 50 and 52 in order to keep the flux linking the storage loop constant (a requirement when the loop is entirely superconducting).

The magnitude of the persistent current depends upon the relative magnitudes of the inductances in the two branches 54 and 56 or 60 and 62. It is preferred to fabricate the circuit so that the inductance in each branch is the same. The loop 52 contains a cryotron control element in each branch and can readily be fabricated to meet this requirement. It will be necessary to introduce extra inductance into the branch 54 of the loop 50 by the use of narrower interconnecting lines. When the branch inductances are equal, the persistent circulating current will be equal to half the applied current. This persistent current represents a stored one. If the direction of the applied current I is upwards along the lines *p* and *q*, the persistent current *I*/2 will flow clockwise around the storage loop 50 and counterclockwise around the storage loop 52, as indicated by the arrows.

If it is desired to store a binary zero, no current is transmitted along the lines *p* and *q*. The resistance of cryotrons 58 and 64 destroys any previously circulating current. The resultant zero persistent current represents a stored zero.

In order to perform a comparison between a stored record and a key, appropriate currents are applied to the lines $\overline{M}$, *p*, and *q*. Consider the storage loop 50. If it contains a persistent current and a current I is transmitted along line *p*, of the same sign and magnitude as used in writing, then the requirement that the flux linking the storage loop 50 remain constant causes a current I to flow in the left hand branch 54 and causes a cancellation of the current in the right hand branch 56, whereupon cryotron 44 becomes superconducting. On the other hand, if no persistent current has been stored, the application of a current I to the line *p* would cause a current *I*/2 to flow in each branch of the storage loop 50. This is sufficient to make cryotron 44 resistive. If no key current is applied to line *p*, cryotron 44 will be held resistive by the persistent current corresponding to a stored one, but will be superconducting if a zero is stored.

Summarizing, cryotron 44 will be resistive if a current is applied to line *p* when a zero is stored, or if no current is applied when a one is stored. Under other conditions cryotron 44 will be superconducting. The same rules apply to the state of cryotron 42 in the other storage loop 52.

The currents applied to the lines *p* and *q* during keying are shown in Table I below along with the currents used in writing. The currents which result on the control elements of cryotrons 44 and 42 are shown in Table II.

TABLE I

| Command | Currents On | | |
|---|---|---|---|
| | $\overline{M}$ Line | *p* Line | *q* Line |
| Write One | 0 | I | I |
| Write Zero | 0 | 0 | 0 |
| Key One | I | 0 | I |
| Key Zero | I | I | 0 |
| Mask | 0 | I | I |

TABLE II

| Key | Control Currents On | | | |
|---|---|---|---|---|
| | Cryotron 44 | | Cryotron 42 | |
| | Stored One | Stored Zero | Stored One | Stored Zero |
| Key One | I/2 | 0 | 0 | I/2 |
| Key Zero | 0 | I/2 | I/2 | 0 |
| Mask | 0 | I/2 | 0 | I/2 |

Recapitulating, when a mask command is given, cryotrons 48 and 46 are resistive and cryotron 43 is superconducting. Only the line $E_L$ is open. A stored zero and a key zero makes cryotrons 43, 44, and 48 resistive. Again, only the line $E_L$ is open. A stored zero and a key one cause cryotrons 42, 43, and 46 to be resistive while cryotrons 44 and 48 are superconducting. The branch from line $E_L$ to line $L_L$ only is open. When a zero key is applied to a stored one, cryotrons 42, 43, and 48 are resistive while cryotrons 44 and 46 are superconducting. Only the path from line $E_L$ to line $G_L$ is open. Finally, for a stored one and a key one, cryotrons 43, 44, and 46 are resistive while cryotrons 42 and 48 are superconducting. The line $E_L$ is open.

In order to read a stored record, current is applied to the line R, making cryotrons 70 of that word register resistive. If a one is stored in a bit circuit, a persistent current will be flowing in the loop 52 and cryotron 68 will be resistive. Thus the line $0_j$ will be resistive. On the other hand, if a zero is stored, cryotron 68 and hence the line $0_j$ will be superconducting.

Some of the circuits in the data module 24 of the memory block 12 have just been described. A description will now be given by circuits in the control module 22.

RESULT STORE

It has already been described in connection with the comparison and bit circuits how an interrogation produces a current on the $G_L$, $L_L$ or $E_L$ line. The purpose of the result store 28 is to store the results of the two consecutive interrogations required to produce a between-the-limits comparison. Referring to FIG. 1B, the result store 28 comprises two flip-flops, $G_{FF}$ and $L_{FF}$ in series. The $G_{FF}$ flip-flop is used to store the result of a lower limit search. The $G_{FF}$ flip-flop comprises a left hand branch including the control element of a cryotron 72 and the gate element of a cryotron 74. The right hand branch of the $G_{FF}$ flip-flop comprises the control element of a cryotron 76, the gate element of a cryotron 78 and the gate element of a cryotron 80.

The $L_{FF}$ flip-flop is used to store the result of an upper limit search. It comprises a left hand branch including the control element of a cryotron 82 and the gate element of a cryotron 84. The right hand branch of the $L_{FF}$ flip-flop includes the control element of a cryotron 86 and the gate element of a cryotron 88.

A switch 90 comprising six cryotrons 92, 94, 96, 98, 100, and 102, which receive control currents from lines $G_c$ and $L_c$, control the comparison current $I_{cc}$ from line $C_L$ so that the result is stored in either the $G_{FF}$ flip-flop or the $L_{FF}$ flip-flop.

Referring to the simplified diagram of FIG. 5, the $G_L$ line divides into two branches. One branch is in series with the gate element of cryotron 100 and the control element of cryotron 74 of the $G_{FF}$ flip-flop. The other branch is in series with the gate element of cryotron 96 and the control element of cryotron 88 of the $L_{FF}$ flip-flop. Similarly, one branch of the $L_L$ line is in series with the gate element of cryotron 98 and the control element of cryotron 78 of the $G_{FF}$ flip-flop; and the other branch is in series with the gate element of cryotron 94 and the control element of cryotron 84 of the $L_{FF}$ flip-flop. Lastly, one branch of the $E_L$ line is in series with the gate element of cryotron 102 and the control element of cryotron 74 of the $G_{FF}$ flip-flop, and the other branch is in series with the gate element of cryotron 92 and the control element of cryotron 84 of the $L_{FF}$ flip-flop.

Referring again to FIG. 1B and the simplified diagram of FIG. 6, another circuit of the result store 28 is fed current from a line $F_R$. Depending upon the states of the $G_{FF}$ and $L_{FF}$ flip-flops, the current will flow in one of two branches; either the branch comprising the gate elements of cryotrons 82 and 72 and the control element of cryotron 104 or the branch comprising the parallel gate elements of cryotrons 86 and 76. This circuit is used to select a word for reading. The word selected is the first physically located word whose result store 28 indicates that the record selected falls within the chosen limits.

Referring to FIG. 1B and the simplified diagram of FIG. 7, another circuit of the result store is fed current from a line $M_{FF}$. The current may flow through one of two parallel branches; either the branch including the control element of cryotron 80 and the gate element of cryotron 106, or the branch including the gate element of cryotron 108. This circuit is used to erase the contents of the result store of the word just read out. After the erasure, the procedure outlined above can be used to locate and read out the subsequent words of the set that lies between the chosen limits.

ACTIVE FLIP-FLOP

Another important circuit of the control module 22 is the active flip-flop 30. Referring to FIG. 1B again, the loop of flip-flop 30, reading clockwise, contains the gate element of a cryotron 110, the control element of a cryotron 112, the control element of a cryotron 114, the control element of a cryotron 116, the gate element of a cryotron 118, and the control element of a cryotron 120. The flip-flop 30 serves the function of distinguishing words containing active information or records from those words containing no information or discarded information. Cryotrons 120 and 112, which are fed the comparison current $I_{cc}$ from line $C_L$ are used to insure that only active records are considered during an interrogation.

The most important function of the active flip-flop 30 is in the writing of new records into inactive word registers. For this purpose a circuit is fed current from a line $F_w$. The current may flow in one of two branches; either the branch containing the control element of a cryotron 122 and the gate element of cryotron 114, or the branch containing the gate element of cryotron 116. The above circuit selects the first physically located inactive word register for writing a new record therein. A circuit which is fed a current from line $W_1$ and includes parallel branches containing in one branch the gate element of a cryotron 124 and in another branch the gate element of a cryotron 126 and the control element of cryotron 118, serves to mark the flip-flop 30 of this first located word as an active register at the time the new information is written in.

The detailed circuitry and procedures will now be discussed.

*The reading procedure*

The detailed procedure of selecting and reading out a group of records will be described in sequence. General reference is made to the circuit diagram of FIGS. 1A and 1B. Specific references are made to the simplified circuits extracted from FIGURE 1. The times $t_1$, $t_2$ etc. refer to the time sequence in which the various operations are performed.

*At time $t_1$*

Referring to FIG. 5, comparison current $I_{cc}$ is applied to line $C_L$. In each word register 20 this current will be steered by cryotrons 120 and 112 of the active flip-flop 30 so that in inactive registers 20 it flows through the bypass branch $\overline{C}_L$. The lower of the two limits is applied as a key. For each bit, current is applied to two of the three lines $q$, $p$, and $\overline{M}$ as determined by the applied key (see Table I above). In each active register 20, the comparison current $I_{cc}$ will be steered by the bit circuit so that at the interface between the control module 22 and the data module 24, the current is flowing on the $G_L$, $E_L$, or $L_L$ line depending upon whether the key portion of the record is respectively greater than, equal to, or less than the applied key.

Also at time $t_1$, current is removed from line $L_c$ and applied to the line $G_c$ making cryotrons 92, 94, and 96 resistive. There is now only one superconducting path for the comparison current $I_{cc}$ through the entire data module 24 and control module 22. For word registers 20 containing records greater than or equal to the applied key, the comparison current will flow through the control elements of cryotrons 74 so that the latter will become resistive, and the current $I_{DC1}$, flowing in the flip-flops $G_{FF}$, will, in these registers, be forced into the branches containing cryotrons 78. These flip-flops $G_{FF}$ will then be in the set state. For registers containing records less than the applied key, the comparison current will flow through the control elements of cryotrons 78 so that they will become resistive. The current $I_{DC1}$ flows through the branch containing cryotron 74 and each flip-flop $G_{FF}$ of these registers will be switched to the reset state.

*At time $t_2$*

The current on line $G_c$ is terminated and the current reapplied to line $L_c$ so that cryotrons 98, 100, and 102 will be resistive. The comparison current $I_{cc}$ will then control cryotrons 88 or 84 in the flip-flops $L_{FF}$. It may be desirable to permit a short time delay before removing the key currents and applying the key corresponding to the larger of the two limits. When selection on the basis of equality is desired, the key may be left on or the same key may be reapplied. For records less than or equal to this second applied key, cryotron 84 will become resistive, switching each flip-flop $L_{FF}$ to the set state. For records greater than the applied key cryotrons 88 will be resistive, switching each flip-flop $L_{FF}$ to the reset state.

*At time $t_3$*

The comparison current $I_{cc}$ is turned off. It is probably desirable to permit this current to fall to near zero and to allow eddy currents in the $C_L$ line to decay before removing the key currents. Now all active word registers 20 in the memory are characterized by the state of their pair of flip-flops $G_{FF}$ and $L_{FF}$. In particular only those words which are between the limits of the two keys (inclusively) have their flip-flops in the set state. In all inactive word registers 20, their most recent interrogation, when they were last active, will have left the $G_{FF}$ flip-flop in the reset state.

Also at time $t_3$ current is applied to line $F_R$ (FIG. 6). In all selected word registers 20 cryotrons 86 and 76 will be resistive and cryotrons 82 and 72 superconducting. In all other registers either cryotrons 86 or 76, but not both, and either cryotron 82 or 72 or both, will be resistive. Thus at the first selected register, $F_R$ current will be diverted from line $F_R$ to bypass branch $\overline{F}_R$ and will continue on $\overline{F}_R$ to the top of the memory. As a result, cryotron 104 will become resistive only in this first selected register. In only this register will $I_{DC2}$ be transferred from line $\overline{R}$ to line R and cause all cryotrons 70 in the bit circuits 26 to become resistive.

Also at time $t_3$, the output reset current $0_s$, which is normally continuous, is removed. The purpose of the $0_s$ current is to hold $I_{DC3}$ on $0_j$ branch of each $0_j$ flip-flop. The $0_j$ flip-flop includes one parallel branch containing the parallel gate elements of cryotrons 68 and 70 and another parallel branch containing the gate element of a cryotron 132 and the control element of a cryotron 134. When the $0_s$ current is removed, current in the $0_j$ branch will remain unchanged unless both cryotron 68 and 70 of any one bit on the $0_j$ line become resistive. This can only occur in bits containing a stored one which are part of the register through which current is flowing in the R line. Bits containing a "one" in this first selected register will cause current to be transferred to the respective $\overline{0}_j$ lines, making the output gates 134 resistive.

*At time $t_4$*

The output gates 134 on which a binary "one" is being read out will be resistive. For a time interval, no currents will be changed in the bit circuits 26, thereby permitting the sense amplifiers $S_o$ to respond to the voltage developed across the resistive output gates 134. However, during this interval, operations may be performed in the control module 22, to prepare to interrogate the next selected word register 20.

Therefore, also at time $t_4$, current is removed from line $F_R$. Delayed somewhat from time $t_4$ to permit the $F_R$ line current to decay, line $M_{FF}$ is pulsed (FIG. 7). In the first selected word register 20 only, cryotron 108 will be resistive and cryotron 106 not resistive due to the presence of current $I_{DC2}$ in the R branch. In this register only, the $M_{FF}$ current will be diverted through the control element of cryotron 80, making cryotron 80 resistive and switching the $G_{FF}$ flip-flop to the reset state.

During this same time interval, the read out may be made destructive if desired by switching the active flip-flop 30 to the inactive state. This is done by applying a pulse to line $D_1$. Only in the register being read is cryotron 128 resistive and cryotron 130 superconducting, so that the $D_1$ line current will be steered through the control element of cryotron 110 switching the current through the active flip-flop 30 from line A to line $\overline{A}$, or from active to inactive. In all other registers, since $I_{DC2}$ is in line $\overline{R}$ rather than R, the $D_1$ line current will bypass cryotron 110.

*At time $t_5$*

The pulse on line $M_{FF}$ is terminated. A pulse is applied to line $R_c$ which renders cryotron 136 resistive and transfers the current $I_{DC2}$ from line R to line $\overline{R}$ in the just read register. At the same time, the output reset current $\mathbf{0}_s$ may be reapplied to prepare the $\mathbf{0}_j$ flip flops for the next read out.

*At time $t_6$*

A pulse is again applied to line $F_R$. Because the $G_{FF}$ flip-flop in the first selected register has been reset, the R line current will be established in the second selected register. The output reset current $\mathbf{0}_s$ is removed.

*At times $t_7$, $t_8$ and $t_9$, repeat as for $t_4$, $t_5$, and $t_6$*

These three steps are repeated until on the last step, the applied pulse on the $F_R$ line flows through the memory on the $F_R$ line without crossing to the $\overline{F}_R$ line (FIG. 6). This will occur when the last selected register has been read. $F_R$ line current will flow through output cryotron 138 and the detection of the resistive state of this cryotron by the sense amplifier $S_o$ may be used to arrest the cyclic reading process.

If no records existed in the memory between the two applied limits, the indication that the reading process was complete would be obtained shortly after time $t_3$ when the $F_R$ line current was first applied.

*The writing procedure*

When a new record or a changed record is to be written in the memory, it is written in the first vacant register determined by the active flip-flop 30. All bits in the word are written simultaneously.

*At time $t_1$*

In order to select the first inactive word register 20, a current is applied to line $F_W$ (FIG. 8). In all active registers 20, cryotron 114 will be resistive because current $I_{DC2}$ will be flowing in the active line A of the flip-flop 30. In all inactive registers, current $I_{DC}$ will be flowing in the inactive line $\overline{A}$, thereby holding cryotron 116 resistive. Thus, at the first inactive register, the pulse will transfer from line $F_W$ to the bypass line $F_W$ and will continue on bypass line $\overline{F}_W$ throughout the memory. In this word only, cryotron 122 will become resistive, diverting $I_{DC2}$ from the bypass line $\overline{V}$ to line V and making cryotrons 58 and 64 in the bit circuits 26 resistive. Any persistent currents flowing in the storage loops of the bit circuits 26 of this word register 20 will be destroyed. Previous operations of writing had ensured that $I_{DC2}$ was flowing in line $\overline{V}$ in all other registers.

Before the next step it is desirable that sufficient time has elapsed to permit the current to become established in line V, but it is not necessary to wait until the persistent currents have decayed.

*At time $t_2$*

The writing currents are applied on the *p* and *q* lines of the bit circuits 26 into which it is desired to write a binary one. The behavior of the storage loops has been described previously. It should be noted that the pulsing of lines *p* and *q* does not disturb the information stored in unselected word registers since their cryotrons 58 and 64 are never resistive.

Also at $t_2$, current on line $F_W$ is terminated. After a slight delay, to permit the $F_W$ line current to decay, current is applied to line $W_1$. In this selected register, the resistive gate 124 steers the $W_1$ line current over cryotron 118 switching the $I_{DC2}$ current to line A, thereby switching the active flip-flop 30 to the active state to indicate that this register now contains a stored record. In all other registers, cryotrons 126 will be resistive and the $W_1$ line current will bypass cryotrons 118.

*At time $t_3$*

Current on line $W_1$ is terminated. A pulse is applied to the line $W_2$ to transfer $I_{DC2}$ from line V to line $\overline{V}$.

*At time $t_4$*

The writing currents on the *p* and *q* lines may be terminated.

Should an attempt be made to write a record into a filled memory, current will continue to flow on the $F_W$ line because all active flip-flops will have $I_{DC2}$ current flowing in the A line. As a result cryotron 140 in the $F_W$ line will become resistive, and the fact that the memory is filled will be communicated to the output exchange register 14 through sense amplifier $S_W$ while the information to be stored is still in the input exchange register 10.

*Clearing of all records*

The following procedure is used to clear all records. Line $D_2$ (FIG. 1B) is pulsed to switch cryotron 142 in the $\overline{R}$ line resistive and thus switch the current $I_{DC2}$ in each register 20 into the R lines. Then line $M_{FF}$ is pulsed and current is steered through cryotron 80 by the resistive cryotron 108 to switch all $G_{FF}$ flip flops to the reset state. At the same time, line $D_1$ is pulsed and current is steered through cryotron 110 by resistive cryotron 128 to switch all active flip flops to the inactive state. Finally, line $R_c$ is pulsed to switch cryotron 144 in the R line resistive and thus return all currents to the $\overline{R}$ line.

Line $D_2$ has the additional function of writing binary zeros in all bits in all registers by steering current with cryotron 146 into the V line in each register. Line $W_2$ must be pulsed (in coincidence with line $D_1$) to switch cryotron 148 in line V resistive to return the current from line V to line $\overline{V}$.

We claim:

1. In a memory system including means for storing word information in digital form, means for reading out those words for which a selected portion of their information content lies between two predetermined numerical limits, comprising:

means for simultaneously comparing the information contained in each stored word with the information content of one of said predetermined limits;

means for simultaneously comparing the information contained in each stored word with the information content of the other of said predetermined limits;

means for storing the results of such comparisons for each word;

and means for reading out in sequence those words for which the stored result indicates that the selected portion of the stored information lies numerically between said predetermined limits.

2. In a memory system provided with storage means for storing binary information, means for reading out those words of stored information for which a selected portion of their information content lies between two predetermined numerical limits, comprising:

means for transmitting first key information representing the lower one of said numerical limits simultaneously to all of said storage means;

means for comparing all of the stored bits of information simultaneously with said first key information;

means for storing the result of the lower limit comparison in each of the stored words simultaneously;

means for transmitting second key information representing the upper one of said numerical limits simultaneously to all of said storage means;

means for comparing all of the stored bits of information simultaneously with said second key information;

means for storing the result of the upper limit comparison in each of the stored words simultaneously;

and means for sequentially reading out those words for which the stored result indicates that the selected portions of the stored information lies numerically between said predetermined limits.

3. In a memory system provided with storage means for storing binary information, means for reading out those words of stored information for which a selected portion of their information content lies between two predetermined numerical limits, comprising:

means for transmitting first key informaiton representing the lower one of said numerical limits simultaneously to all of said storage means;

means for comparing all of the stored bits of information simultaneously with said first key information;

means for storing the result of the lower limit comparison in each of the stored words simultaneously;

means for transmitting second key information representing the upper one of said numerical limits simultaneously to all of said storage means;

means for comparing all of the stored bits of information simultaneously with said second key information;

means for storing the result of the upper limit comparison in each of the stored words simultaneously;

means for locating and reading out the first physically located word for which the stored result indicates that its information content falls within said predetermined limits;

means for masking said first physically located word from further locating and reading operation;

and means for sequentially locating and reading out other words, in the order of their physical location, for which the stored result indicates that the selected portion of the stored information lies numerically between said predetermined limits.

4. An associative memory system, comprising:

a plurality of word registers arranged in an ordered array;

means for writing binary information into the first empty word register and for rendering it immune from further writing operations;

means for comparing given key information with the information stored in only those word registers in which information has been intentionally written;

and means for reading out those words for which a selected portion of their information content lies between two predetermined numerical limits.

5. An associative memory system according to claim 4, and further including means for rendering said word registers available for writing of new information after the previously stored information has been read out.

6. An associative memory system according to claim 4, and further including means for clearing the word registers of all record information.

7. An associative memory system according to claim 4, and further including means for masking from the comparison operations those portions of the word registers that are not included as part of said given key information.

8. An associative memory system, comprising:

a plurality of word registers arranged in an ordered array;

means for writing binary information into the first empty word register and rendering it immune from further writing operations;

means for comparing given key information with the information stored in only those word registers in which information has been intentionally written;

and means for reading out those words for which a selected portion of their information content lies between two predetermined numerical limits, said last mentioned means including means for simultaneously comparing the information contained in each stored word with the information content of one of said predetermined limits;

means for simultaneously comparing the information contained in each stored word with the information content of the other of said predetermined limits;

means for storing the results of such comparisons for each word;

and means for reading out in sequence those words for which the stored result indicates that the selected portion of the stored information lies numerically between said predetermined limits.

9. An associative memory system according to claim 8, and further including means for rendering said word registers available for writing of new information after the previously stored information has been read out.

10. An associative memory system according to claim 8, and further including means for clearing the word registers of all record information.

11. An associative memory system according to claim 8, and further including means for masking from the comparison operations those portions of the word registers that are not included as part of said given key information.

12. A memory bit circuit comprising:

first and second superconductive bistable storage loops each arranged to sustain a persistent circulating current;

means for selectively establishing a separate persistent circulating current in each of said storage loops in accordance with a predetermined command for storing binary information;

and means for indicating whether the information stored in said loops is numerically equal to, greater than, or less than a given binary digit.

13. A memory bit circuit comprising:

first and second superconductive bistable storage loops each arranged to sustain a persistent circulating current, means for selectively establishing a separate persistent circulating current in each of said storage loops in accordance with a predetermined command for storing binary information;

means for numerically comparing the information stored in said loops with a given key digit;

means for indicating the result of the comparison;

and means for reading out the information stored in said loops.

14. A memory bit circuit, comprising:

a first superconducting line adapted to receive an input signal;

first and second electrically parallel superconducting branches in series with said first superconducting line and forming a first storage loop;

a second superconducting line adapted to receive an input signal;

third and fourth electrically parallel superconducting branches in series with said second superconducting line and forming a second storage loop;

first and second gate elements in series with said second and fourth branches respectively;

a third superconducting line adapted to receive an input signal and coupled to said first and second gate elements;

a fourth superconducting line adapted to receive an input signal;

fifth and sixth electrically parallel superconducting branches in series with said fourth superconducting line;

third and fourth gate elements in series with said fifth and sixth branches, respectively, said third gate element being coupled to said fourth branch;

fifth and sixth superconducting lines;

fifth and sixth gate elements connected in series between said fifth and sixth superconducting lines, said fifth gate element being coupled to said first superconducting line and said sixth superconducting gate being coupled to said second superconducting line;

a seventh gate element connected between said fourth superconducting line and the junction of said fifth and sixth gate elements and coupled to said second branch;

a seventh superconducting line adapted to receive an input signal and coupled to said fourth gate element;

an eighth superconducting line adapted to receive an input signal;

seventh and eighth electrically parallel superconducting branches in series with said eighth superconducting line;

an eighth gate element in series with said seventh branch and coupled to said third branch;

a ninth gate element in series with said eighth branch;

and a ninth superconducting line adapted to receive an input signal and coupled to said ninth gate element.

15. A memory bit circuit, comprising:

a first superconducting line adapted to receive an input signal;

first and second electrically parallel superconducting branches in series with said first superconducting line and forming a first storage loop;

a second superconducting line adapted to receive an input signal;

third and fourth electrically parallel superconducting branches in series with said second superconducting line and forming a second storage loop;

first and second gate elements in series with said second and fourth branches respectively;

a third superconducting line adapted to receive an input signal and coupled to said first and second gate elements;

a fourth superconducting line adapted to receive an input signal;

fifth and sixth electrically parallel superconducting branches in series with said fourth superconducting line;

third and fourth gate elements in series with said fifth and sixth branches, respectively, said third gate elements being coupled to said fourth branch;

fifth and sixth superconducting lines;

fifth and sixth gate elements connected in series between said fifth and sixth superconducting lines, said fifth gate element being coupled to said first superconducting line and said sixth superconducting gate being coupled to said second superconducting line;

a seventh gate element connected between said fourth superconducting line and the junction of said fifth and sixth gate elements and coupled to said second branch;

and a seventh superconducting line adapted to receive an input signal and coupled to said fourth gate element.

16. A memory bit circuit comprising:

first and second superconductive bistable storage loops each arranged to sustain a persistent circulating current;

means for selectively establishing a separate persistent circulating current in each of said storage loops in accordance with a predetermined command for storing binary information;

a first cryotron controlled by current in said first loop;

a second cryotron controlled by current in said second loop;

means for interrogating said loops with key information whereby said first cryotron is resistive and said second cryotron is superconducting when a match occurs between the stored information and said key information, and whereby said first cryotron is superconducting and said second cryotron is resistive when a mismatch occurs between said stored information and said key information;

means for controlling a third cryotron so that it is superconducting when the interrogating information is a binary one and is resistive when the interrogating information is a binary zero;

means for controlling a fourth cryotron so that it is resistive when the interrogating information is a binary one and is superconducting when the interrogating information is a binary zero;

and means coupling said cryotrons in three paths whereby only a first path is superconducting when the second cryotron is superconducting as a result of a match, only a second path is superconducting when the first and third cryotrons are superconducting as a result of the stored information being less than the key information, and only a third path is superconducting when the first and fourth cryotrons are superconducting as a result of the stored information being greater than the key *information*.

17. A memory bit circuit comprising:

first and second superconductive bistable storage loops each arranged to sustain a persistent circulating current;

means for selectively establishing a separate persistent circulating current in each of said storage loops in accordance with a predetermined command for storing binary information;

a first cryotron controlled by current in said first loop;

a second cryotron controlled by current in said second loop;

means for interrogating said loops with key information whereby said first cryotron is resistive and said second cryotron is superconducting when a match occurs between the stored information and said key information, and whereby said first cryotron is superconducting and said second cryotron is resistive when a mismatch occurs between said stored information and said key information;

means for controlling a third cryotron so that it is superconducting when the interrogating information is a binary one and is resistive when the interrogating inforamtion is a binary zero;

means for controlling a fourth cryotron so that it is resistive when the interrogating information is a binary one and is superconducting when the interrogating information is a binary zero;

means for detecting the superconducting state of the second cyrotron;

means for detecting the concurrent superconducting states of the first and third cryotrons;

and means for detecting the concurrent superconducting states of the first and fourth cryotrons.

References Cited by the Examiner

UNITED STATES PATENTS 3,195,109 7/1965 Behnke ---------- 340—172.5

ROBERT C. BAILEY, *Primary Examiner.*

G. D. SHAW, *Assistant Examiner.*